United States Patent
Kurth et al.

(10) Patent No.: US 7,372,949 B1
(45) Date of Patent: May 13, 2008

(54) SYSTEM AND METHOD FOR CALL REDIRECT DETECTION AND TREATMENT

(75) Inventors: John G. Kurth, North Richland Hills, TX (US); James E. King, Little Elm, TX (US); Lee R. Johnson, Plano, TX (US); Randy Hoffman, Plano, TX (US)

(73) Assignee: Evercom Systems, Inc., Dallas, TX (US)

( * ) Notice: Subject to any disclaimer, the term of this patent is extended or adjusted under 35 U.S.C. 154(b) by 740 days.

(21) Appl. No.: 10/646,638

(22) Filed: Aug. 22, 2003

Related U.S. Application Data (63) Continuation-in-part of application No. 10/217,149, filed on Aug. 12, 2002, now Pat. No. 7,203,301.

(51) Int. Cl.
*H04M 3/436* (2006.01)
*H04M 3/54* (2006.01)
*H04M 3/56* (2006.01)
*H04M 3/58* (2006.01)

(52) U.S. Cl. .......... 379/196; 379/201.02; 379/207.01; 379/210.02; 379/211.02; 379/212.01

(58) Field of Classification Search ............... 379/188, 379/189, 190, 196, 197, 198, 207.01, 210.02, 379/211.02, 212.01, 201.02
See application file for complete search history.

(56) References Cited

U.S. PATENT DOCUMENTS 5,604,792 A * 2/1997 Solomon et al. ......... 379/88.23
6,195,422 B1   2/2001 Jones et al.
6,307,926 B1 * 10/2001 Barton et al. ............ 379/189
6,639,977 B1  10/2003 Swope et al.
6,687,364 B1 *  2/2004 Lehtinen ................. 379/219
6,836,540 B2 * 12/2004 Falcone et al. ....... 379/127.02
2002/0168060 A1  11/2002 Huie

OTHER PUBLICATIONS

U.S. Appl. No. 10/190,315, R. Falcone, et al.
U.S. Appl. No. 10/135,883, D. Falcone, et al.
U.S. Appl. No. 10/135,878, J. Viola, et al.
U.S. Appl. No. 10/217,149, R. Mudd, et al.

* cited by examiner

*Primary Examiner*—Harry S. Hong
(74) *Attorney, Agent, or Firm*—Slater & Matsil, L.L.P.

(57) ABSTRACT

Disclosed are systems and methods in which call intelligence, such as may be disposed in communication with signaling systems utilized in controlling calls, is used to provide information for making determinations with respect to the treatment of calls. Call intelligence may be coupled to or disposed within such networks to receive signaling therefrom and/or transmit signaling thereto for determining the appropriate treatment of a call and, preferably, controlling the treatment of a call in accordance with such determination. Signaling messages received by call intelligence may be utilized to determine that a particular calling activity (e.g., enhanced calling service such as call redirecting or three-way calling) is being employed, to collect data with respect to a call, and the like. Signaling messages transmitted by call intelligence of the present invention may be utilized to prevent a call from being setup, to prevent a particular aspect of a call, to provide information to a billing entity for payment, and the like.

99 Claims, 4 Drawing Sheets

SYSTEM AND METHOD FOR CALL REDIRECT DETECTION AND TREATMENT

CROSS-REFERENCE TO RELATED APPLICATIONS

The present application is a continuation-in-part of commonly assigned U.S. patent application Ser. No. 10/217,149 entitled "System and Method for Call Treatment," filed Aug. 12, 2002 now U.S. Pat. No. 7,203,301, to which the benefit of priority is hereby claimed and the disclosure of which is hereby incorporated herein by reference. The present invention is related to co-pending and commonly assigned U.S. patent application Ser. No. 09/640,831 entitled "System and Method for Reverse Billing of a Telephone Call," Ser. No. 10/135,878 entitled "Information Management and Movement System and Method," filed Apr. 29, 2002, Ser. No. 10/135,883 entitled "Optimizing Profitability in Business Transactions," filed Apr. 29, 2002, Ser. No. 10/190,315 entitled "Systems and Methods for Offering a Service to a Party Associated with a Blocked Call," filed Jul. 3, 2002, the disclosures of each of which are hereby incorporated herein by reference in their entirety.

TECHNICAL FIELD

The present invention relates generally to telephony call processing and, more particularly, to making call treatment determinations with respect to particular calls.

BACKGROUND OF THE INVENTION

Since the divestiture of North America's telecommunication market, there has been an increase in the amount of participants throughout the various fields of the industry: both facilities and non-facilities based. Additional competitors, e.g., competitive local exchange carriers (CLECs) have joined incumbent local exchange carriers (ILECs), local service providers (LSPs), line resellers, service providers, etc., in the telephony market.

While expanded competition has arguably benefited the public, an undesired result has included many, often confusing, choices of service providers. The increase in competition has also disrupted the fluidity of the telecommunications market that existed before divestiture for both the consumer and the market participant. One area affected by the increased amount of competitors in the telephone market is billing. A customer could potentially receive a separate billing statement for services received from each subscribed telephone service provider. Additionally, some market participants do not have the ability to sufficiently identify the end customer receiving its service.

Convergence or composite billing is an attempt to address and resolve some of the issues by providing one consolidated communications bill to the customer. The composite bill comprises charges incurred by the customer having a variety of telephone service providers, e.g., local, long distance, Internet, cell phone, paging, alternative billing, etc. This single communication bill is compiled and sent to the customer by a billing entity ultimately responsible for billing the customer. For example, a customer may contract with two different service providers for local and long distance service even though these service providers may be competitors in both local and long distance markets. One of these service providers, or perhaps some other company, may ultimately be responsible as the billing entity for providing one complete telephone communications bill to the customer. The other service providers will receive compensation dependent upon their respective business relationship with the billing entity.

Due to complexities involved with convergence billing, many industry participants may be susceptible to revenue losses because of the inability to identify the ultimate billing entity responsible for billing the party receiving its services. It is important for service providers seeking compensation to adequately identify the billing entity associated with the customer receiving such services to avoid monetary loss resulting from an unpaid service.

Presently, many phone companies utilize a line information database (LIDB) for acquiring information associated with a telephone number. LIDBs provide a variety of information. Some of the information stored in the LIDB relates to billing entities associated with telephone numbers. This information can be obtained directly, or indirectly, from fields such as operating company numbers (OCNs), account owner (AO), originating line number screening (OLNS), line providers, alternative billing services, number portability, calling features, etcetera. Typically, LIDB owners charge a fee to subscribers for accessing the information compiled within the LIDB.

An alternatively billed call, e.g., collect call, is a service provided to telephone customers wherein another party, e.g., called party, is billed for the call as opposed to the calling party or originating line number as are routinely billed. Upon receiving a request for a collect call, the telephone company ultimately responsible for billing the calling party (calling party billing entity), will attempt to identify the billing entity ultimately responsible for billing the called party (called party billing entity). This information is often obtainable through the LIDB. If the identity of the called party billing entity is not obtainable, the caller's telephone company may be reluctant to connect the call between the parties. Because of the risk involved with connecting a collect call to a called party having an unidentified billing entity, many callers' billing entities may choose not to complete the connection for the call and thus, forgo potential revenues. This loss of revenue may be due to the inability to accurately bill for services provided or the perception that the called party to be billed is not a credit worthy consumer. Regardless, potential revenues associated with unbillable and uncollected collect calls are deferred, perhaps never to be realized.

Hence there is a need for a more reliable method of managing the risks of charge backs and unbillable calls where the charges are not billed to the account associated with the line or service of the call originator.

Among the basic building blocks of the PSTN are the switching, signaling, and intelligent network service systems. The switching systems are spread throughout the world primarily as central (local) office switches or service switching points (SSP). These switches connect the line of one party to another party's line or to an outgoing interoffice transmission facility. In addition to switching calls, SSPs also provide usage measurements of calls for billing purposes. Interoffice transmission facilities consist of the physical medium—typically fiber optics or wireless—to connect switching systems.

The signaling system provides the signaling capabilities to establish a call between switching systems. The most common type of signaling used in the PSTN in the United States is referred to as Common Channel Signaling System Number 7 (CCS/SS7 or simply SS7). A telecommunications network that uses SS7 signaling sends signaling messages or packets over a packet network to exchange call control and service information among network elements. SS7 is a key element in supporting a large number of applications in telecommunications networks ranging from call control or basic call setup, to intelligent network services and efficient interconnection of networks.

Intelligent network elements include a variety of adjuncts, intelligent peripherals and databases that enable sophisticated services, such as toll free service, calling card services and other intelligent network-based services. Not all networks contain intelligent network capabilities, thus severely limiting the ability of the network operator to provide sophisticated services and maximize their basic network infrastructure.

A particular type of network architecture that most ILECs employ is referred to as an advanced intelligent network (AIN or IN) architecture. Within a basic AIN architecture, the switching, signaling and service network elements may include SSPs, signal transfer points (STP), signaling points (SP), and signaling control points (SCP). In a basic AIN architecture terminals (such as telephones, computers, cell phones, etcetera) are coupled through local loops to SSPs in the central offices. These terminals are then coupled through links to an STP and from there to an SCP.

In practice many other AIN architectures exists having one or more SSPs coupled to one or more STPs. These STPs may in turn be coupled to one or more SCPs which in turn may be coupled to one or more STPs. Any number and type of terminals can be coupled to one or more SSPs.

In these architectures, SSPs are used for switching calls and establishing transmission paths to connect the calling party to a called party. The SSPs formulate and process SS7 messages for call setup and intelligent network services. A conventional SSP formulates two basic types of messages: ISDN user part (ISUP) messages that are used to support basic call set up and transaction capabilities application part (TCAP) messages that are used to support intelligent network services, such as toll free service. These messages typically carry a request or query for information or they carry information responding to a service request.

Generally STPs are packet switches with limited intelligence used to route the signaling messages between network elements. SCPs maintain service logic and database information in support of AIN services.

A Basic Call Model has been developed for describing the processing done by an SSP in connection with the AIN to establish a two-party call. The Call Model identifies various points in call (PICs). PICs are stages of processing a call, beginning with off-hook by the calling party through on-hook by either party. The Call Model consists of half-call models: the originating basic call model (OBCM) and the terminating basic call model (TBCM). Under the AIN Call Model, there are two types of events that cause SSPs to communicate with an SCP during a call, namely triggers and requested events.

Events may occur at certain PICs called detection points (DPs). Triggers specify a condition under which an AIN SSP should suspend call processing and invoke AIN service logic. In response to a trigger the relevant SSP involved with an attempted call queries service logic residing in the relevant SCP to produce instructions for influencing subsequent call processing. For example, an origination attempt trigger detection point (TDP) is encountered after an SSP has received a call setup request. The "off-hook immediate" trigger can be placed at this TDP to initiate a TCAP query to the SCP. The SCP will then contain service logic that instructs the SSP how to process the call. Industry standards have established a basic set of TDPs and triggers.

Events are detected as a result of processing a call. AIN enables an SCP to send a next event list (NEL) of subsequent events that may occur during a call handled by an AIN SSP. Accordingly, when any of the events on the list occurs, the SSP may be required to suspend call processing and launch a query to the relevant SCP.

There are two general types of requested events. A first type of requested event are the event detection point (EDP) requests (EDP-Requests). A second type of requested event are the EDP notifications (EDP-Notifications).

In response to an EDP-Request, an SSP stops call processing, sends an EDP-Request message in a TCAP query to the SCP. The SCP waits for instructions from the SCP for further call handling.

In response to an EDP-Notification the SSP sends an EDP-Notification message to the SCP but the SCP does not await a response from the SCP, which does not respond to the SSP. However, the SSP may record the occurrence of the event. These event and trigger capabilities establish the service and control logic of the SCP.

Simple services that utilize the AIN architecture first invoke a TCAP query to an SCP. The TCAP query is routed through one or more STPs to the appropriate SCP. The SCPs recognize the type of query and acquires the appropriate information to generate a return TCAP response message that is sent back to the originating SSP. The SSP then handles the call accordingly. The action taken in response to a TCAP may be a simple look-up, or more complex service logic that will route the call to different resources (e.g., a different directory number based on a parameter such as time of day or geographic location of the originating call). If the proper information to respond to the TCAP query is not contained in the originating SSP, the originating SSP will launch an ISUP message to setup the call with the interconnecting switches.

The SS7 switching network can thus provide real time call handling with intelligence provided. However, the intelligence provided is (a) not very sophisticated in relation to reducing risks for uncollectable or unbillable calls; and (b) is not readily accessible in a real-time sense from non-ILEC entities without relatively large fees.

BRIEF SUMMARY OF THE INVENTION

The present invention is directed to systems and methods in which call intelligence, such as may be disposed in communication with signaling systems utilized in controlling calls, is used to provide information for making determinations with respect to the treatment of calls. For example, the present invention may provide for use of SS7 and AIN networks to affect the treatment of calls. Call intelligence of the present invention may be coupled to or disposed within such networks to receive signaling therefrom and/or transmit signaling thereto for determining the appropriate treatment of a call and, preferably, controlling the treatment of a call in accordance with such determination. For example, signaling messages received by call intelligence of the present invention may be utilized to determine that a particular calling activity (e.g., calling service such as call forwarding, remote call forwarding, or three-way calling) is being employed, to collect data with respect to a call, and the like. Signaling messages transmitted by call intelligence of the present invention may be utilized to prevent a call from being setup, to prevent a particular aspect of a call from being implemented, to provide information to a billing entity for payment, and the like.

Embodiments of the present invention may be deployed with respect to a carrier grade network to provide call treatment decisions before a call setup has been completed, thereby allowing for proactive treatment of calls. Moreover, embodiments of the present invention may be utilized with respect to highly transient, mobile, and/or mutable calling and/or called parties.

According to a preferred embodiment, call intelligence of the present invention is disposed at a position or positions in the call network and/or includes data and algorithms such that a positive or negative decision may be made with respect to a call very rapidly. Embodiments of the invention contemplate the use of information obtained from an intelligent network, such as the SS7 and AIN networks, to make decisions with respect to treatment of a call before completion thereof. For example, an intelligent network engine of an embodiment of the present invention may query intelligent network systems and/or systems coupled thereto, such as the aforementioned SSPs, STPs, and/or SCPs to collect information for use in call treatment determinations. Such information may be collected whether a calling connection is setup or not, and is preferably stored for later use, such as for statistical or trend analysis and/or for use in subsequent call connection determinations.

Embodiments of the present invention may utilize information available from an intelligent network, such as the SS7 and AIN networks (e.g., from transaction capabilities application part (TCAP) and/or ISDN user part (ISUP) messages and/or field indicators), indicating that a particular service or feature is present and/or active with respect to a called number. For example, a call to a called number for which call redirecting is enabled may be prevented using call intelligence of a preferred embodiment in determining call treatment. Such called numbers may be associated with a subscriber line for which call forwarding is available or may be merely be an assigned number (such as in the case of remote call forwarding service).

Calls for which treatment determinations are provided according to embodiments of the present invention may be calls originating from a particular location (e.g., a particular home or business), facility (e.g., a prison/jail facility), or number (e.g., a particular landline telephone number or wireless telephone number). Additionally or alternatively, calls for which treatment determinations are provided according to the present invention may be calls having a particular signaling characteristic and/or attribute associated therewith. In preferred embodiments, 1010XXX dial around calls by a casual customer may be routed to call intelligence of the present invention as part of call setup or treatment.

For the purposes herein, "treatment" with respect to a call means any decision that would be applied to a call attempt or applied to an aspect of a call. Such treatment of a call as provided herein is preferably the a result of obtaining information associated with the call, such as that contained in the SS7 network or AIN, and/or information contained in databases of the present invention, such as are accessible via the SS7 or deployed in an AIN network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
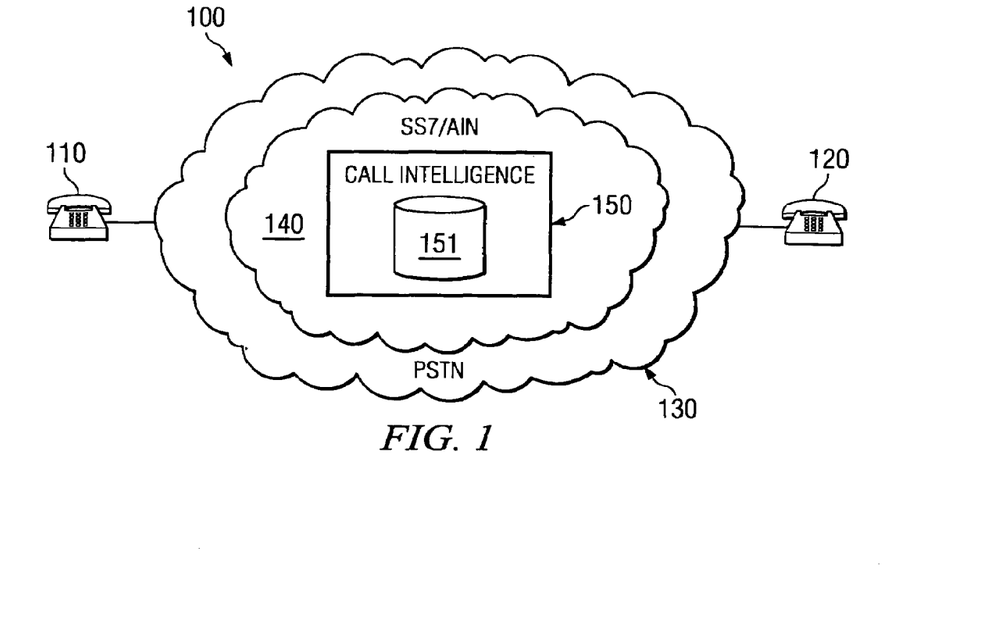
FIG. 1 shows a communication system adapted according to an embodiment of the present invention.

FIG. 1 shows communication system 100 adapted according to an embodiment of the invention. System 100 of FIG. 1 includes terminals 110 and 120 coupled by communication network 130 for providing information communication therebetween. Communication network 130 of the illustrated embodiment comprises the public switched telephone network (PSTN), although embodiments of the present invention may be utilized with alternative or additional communication networks. Communication network 130 of the illustrated embodiment comprises signaling network 140 therein for providing out of band signaling. Signaling network 140 of the illustrated embodiment comprises an AIN, such as using a SS7 network, although embodiments of the present invention may be utilized with alternative or additional signaling networks. It should be appreciated that signaling network 140 may be provided external to communication network 130 or integral thereto, as desired.

In the examples described herein, terminal 110 may be referred to as an originating terminal (e.g., calling party terminal) and terminal 120 may be referred to as a destination terminal (e.g., called party terminal). However, it should be appreciated that either or both such terminals may be utilized in placing an/or receiving calls. Moreover, it should be appreciated that there is no limitation to the use of the two terminals illustrated and, accordingly, any number of terminals may be included with respect to system 100. Similarly, the configuration of the terminals is not limited to that illustrated and, accordingly, the terminals may comprise telephone systems (whether wireline or wireless), computer systems, facsimile systems, pagers, personal digital assistants (PDAs), and/or the like.

Although shown coupled directly to communication network 130, it should be appreciated that one or more of terminals 110 and 120 may be indirectly coupled to a communication and/or signaling network. For example, systems such as a private branch exchange (PBX), call processor, and/or the like may be disposed between a terminal and communication network. Likewise, networks, such as a local area network (LAN), a metropolitan area network (MAN), a wide area network (WAN), an intranet, the Intranet, and/or the like, may be disposed between a terminal and communication network adapted according to the present invention.

Call intelligence 150 of the present invention is preferably coupled to signaling network 140 to receive information therefrom and/or to provide information thereto. It should be appreciated that call intelligence 150 may be disposed centrally, such as for use with a plurality of calling party locations (e.g., a plurality of facilities for which calling services are provided), locally, such as for use with an associated calling party location (e.g., a particular facility for which calling services are provided), or combinations thereof. Moreover, it should be appreciated that additional functionality may be implemented in combination with or in association with call intelligence 150, whether at a same location therewith or coupled thereto. For example, call validation functionality, such as may provide verification of a calling party's identity, account verification, called and/or calling number verification, etcetera, may be implemented in combination with call intelligence 150, as is described in more detail with respect to FIG. 6 below. Additionally or alternatively, functionality such as billing, investigation, customer care, etcetera, such as shown and described in the above referenced patent application entitled "Information Management and Movement System and Method," may be utilized with call intelligence 150 of the present invention.

The illustrated embodiment of call intelligence 150 comprises database 151. Preferably, database 151 stores information useful in "scoring" call attempts and/or other aspects of a call, such as implementation of particular calling services (e.g., call redirecting and three-way calling), by call intelligence 150. Such scoring may be based upon active intelligence and/or organic information. Accordingly, database 151 may comprise information such as operating company numbers, account owner, originating line number screening, dialed number information, call detail records, line providers, alternative billing services, number portability, calling features, call history, law enforcement information, and/or the like.

Database 151 may additionally or alternatively include a participation matrix useful in scoring of calls by call intelligence 150. Negative and/or affirmative call treatment indicators and/or other scoring metrics may be correlated to data of particular variables which may be queried from the signaling network. Actual treatment of a particular call may be a function of participation matrix information. For example, calls from and/or to a particular individual, facility, area, etcetera are treated differently than calls from and/or to other individuals, facilities, areas, etcetera.

Preferred embodiments of database 151 store information obtained from the signaling network and/or information useful in scoring call attempts and/or other aspects of a call. Such information may be utilized by call intelligence 150 in providing batch or non-real time call treatment analysis. Information stored by database 151 may be utilized in performing subsequent call treatment determinations while optimizing resource utilization, such as through avoiding subsequent network queries with respect to a particular called number when a negative call treatment determination has been made within a period of time, e.g., a day, a week, or a month. Additionally or alternatively, information stored by database 151 may be utilized for statistical and/or trend analysis. For example, information obtained from the signaling network, call treatment determinations, called numbers, etcetera may be stored in association with individuals (e.g., indexed by personal identification number (PIN) or other unique identifier) for analysis, such as to recognize that an individual, previously placing substantially only long distance calls, after having been blocked from placing calls to a call redirected number is now almost exclusively placing calls to another local number and therefore is likely participating in some form of long distance fraud. Similarly, trends with respect to a facility may be identified, such as the number of long distance calls dramatically decreasing and an increase in the number of a particular type of call redirecting being detected, indicating a wide spread long distance fraud scheme being implemented at that facility.

It should be appreciated that, although illustrated in FIG. 1 as being within call intelligence 150, database 151 or portions thereof may be disposed in any configuration, whether at a same location as call intelligence 150 or remote therefrom. For example, various components of the above described information stored by database 151 may be stored locally to call processors disposed at facilities for which calling services are provided which are in communication with call intelligence 150 for call treatment determinations.

Scoring of calls by call intelligence 150 may be relative to risk of collection of payment with respect to the call. Accordingly, call intelligence 150 may provide positive and negative information and/or control signals with respect to setting up a call, continuing a call, etcetera in real time to systems of networks 130 and/or 140. Additionally or alternatively, call intelligence 150 may provide information, whether positive or negative, to systems of networks 130 and/or 140 for use with respect to future calls. Such information might be stored locally with respect to systems of networks 130 and/or 140 for use thereby as needed. Additional detail with respect to call scoring, determinations with respect to allowing a call to be made, metrics used in scoring a call, and the like are shown in the above referenced patent application entitled "Optimizing Profitability in Business Transactions," previously incorporated herein by reference.

In the illustrated embodiment call intelligence 150 is disposed within signaling network 140. For example, where signaling network 140 comprises a SS7 AIN, call intelligence 150 may be coupled to or operable upon a SCP. A SCP may provide an address, such as an internet protocol (IP) address, for directing queries to call intelligence 150 of the present invention from SSPs, STPs, SCPs, and/or other devices of signaling network 140 operating to control various aspects of a call between terminals 110 and 120. Accordingly, a SCP may provide a gateway between call intelligence 150 and networks 130 and/or 140.

Call intelligence 150 may be implemented, for example, as an instruction set and associated data, e.g., database 151, operable upon a processor-based platform of a SS7 gateway, a SS7 STP, a SS7 SP, or a class 4 or 5 switch. According to embodiments of the invention, a SS7 gateway, SS7 STP, SS7 SP, or class 4 or 5 switch adapted to operate as described herein is deployed in the network to provide pre-call and/or post call analysis exclusively (i.e., providing call intelligence of the present invention without providing call connection operation as is typical of such equipment).

Figure 2:
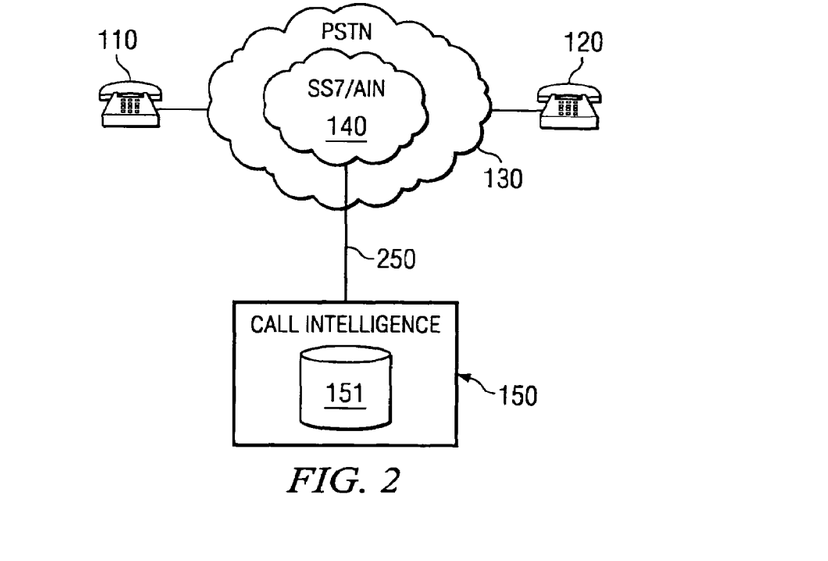
FIG. 2 shows a communication system adapted according to an alternative embodiment of the present invention.

Call intelligence 150 may, additionally or alternatively, be linked to a system of signaling network 140, such as using a data link coupled to a SCP. One such configuration of this alternative embodiment is shown in FIG. 2 wherein call intelligence 150 is coupled to signaling network 140 via data link 250. Data link 250 may comprise a network such as a LAN, MAN, WAN, an intranet, the Internet, and/or the like. Call intelligence 150 of FIG. 2 may be coupled to a SCP (not shown), such as a LS-SCP, or other system providing a signaling gateway integrating disparate networks and/or network protocols. It should be appreciated that call intelligence 150 may be disposed at any convenient location, including on the premises of a facility, such as a hospital, prison, camp, office, etcetera, being serviced, a centralized location perhaps coupled to a plurality of customers being serviced, at a service bureau location, etcetera.

Figure 3:
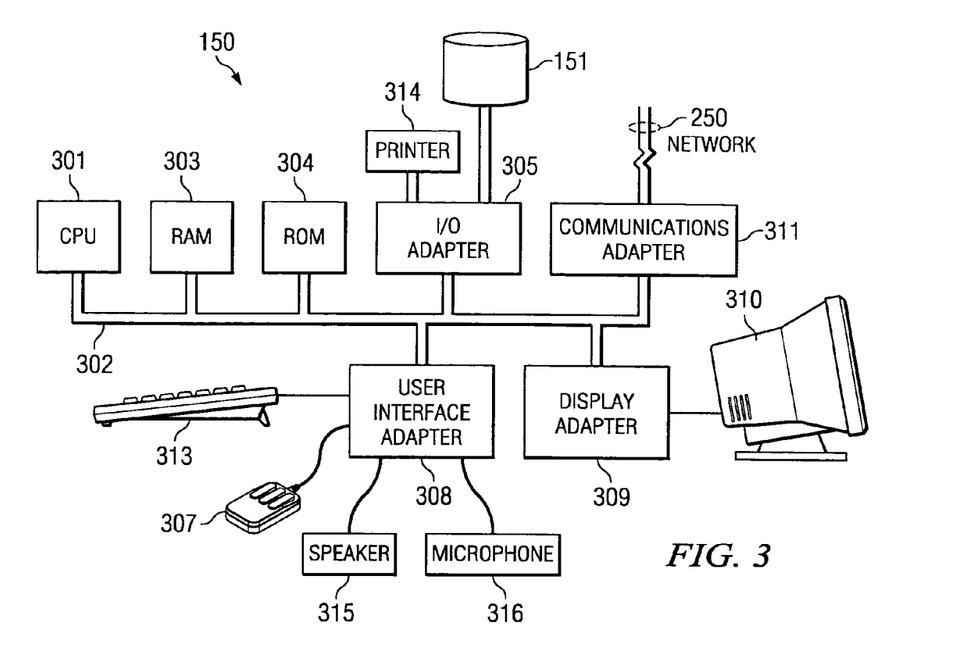
FIG. 3 shows a block diagram of a processor-based system which is adapted to implement call intelligence according to an embodiment of the present invention.

Directing attention to FIG. 3, a block diagram of an embodiment of call intelligence 150 is shown. The components of call intelligence 150 of FIG. 3 may correspond to a processor-based system coupled to signaling network 140 as illustrated in FIG. 2 or may correspond to a processor-based SCP upon which an instruction set and data defining operation as described herein is operable. Central processing unit (CPU) 301 of the illustrated embodiment of call intelligence 150 is coupled to system bus 302. CPU 301 may be any general purpose CPU or multi-CPU system. However, the present invention is not restricted by the architecture of CPU 301 as long as CPU 301 supports the inventive operations as described herein. Bus 302 of the illustrated embodiment is coupled to random access memory (RAM) 303, which may be SRAM, DRAM, SDRAM, etcetera. ROM 304, which may be PROM, EPROM, EEPROM, etcetera, is also coupled to bus 302 in the illustrated embodiment. RAM 303 and ROM 304 hold data and programs, such as an instruction set and associated data of the present invention.

Bus 302 of the illustrated embodiment is also coupled to input/output (I/O) controller 305, communications adapter 311, user interface adapter 308, and display adapter 309. I/O adapter 305 preferably connects to storage devices, e.g., one or more of a hard drive, a CD drive, a floppy disk drive, a tape drive, such as may comprise database 151 of the present invention. I/O adapter 305 of the illustrated embodiment is also connected to printer 314, which would allow the system to print or otherwise output information. Note that the printer may be a printer (e.g. dot matrix, laser, etc.), a fax machine, a copy machine, and/or the like. Communications adapter 311 is adapted to couple call intelligence 150 to a network, such as via data link 250. User interface adapter 308 may be utilized to couple user input devices, such as keyboard 313, pointing device 307, and microphone 316, to call intelligence 150. User interface adapter 308 may also be utilized to provide output, such as sound output via speaker 315. Display adapter 309 may be driven by CPU 301 to control the display on display device 310. Note that the user interface could be local or could be remote, for example, via network 250. When operating remotely, user interface software and display (not shown) would typically be used.

It should be appreciated that when implemented in software, elements of the present invention may be essentially code segments to perform the necessary tasks. The program or code segments can be stored in a computer readable medium or transmitted by a computer data signal embodied in a carrier wave, or a signal modulated by a carrier, over a transmission medium. The computer readable medium may include any medium that can store or transfer information. Examples of a computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etcetera.

Figure 4:
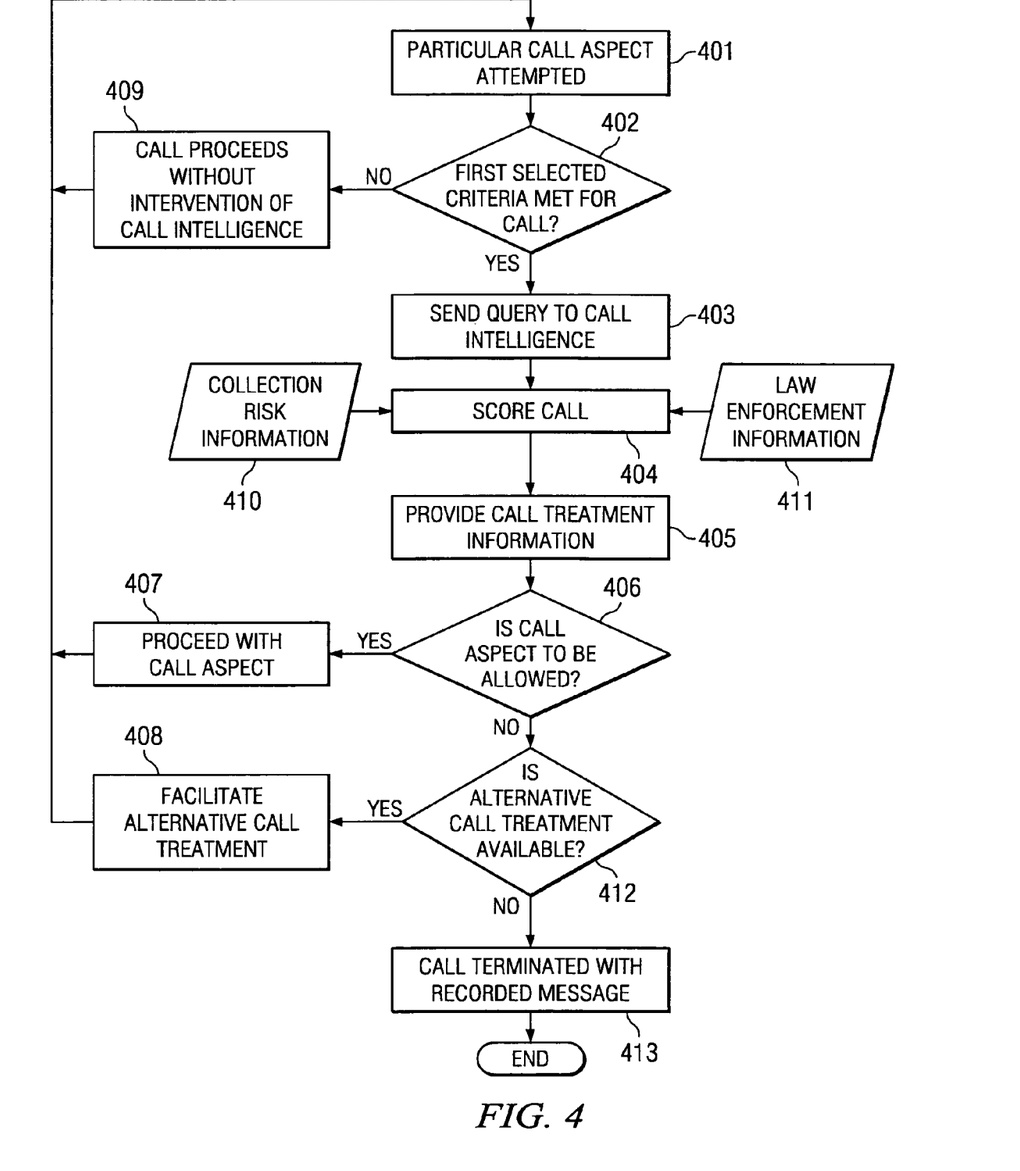
FIG. 4 shows a flow diagram of operation according to an embodiment of the present invention.

FIG. 4 illustrates preferred embodiment steps for call treatment by call intelligence of the present invention. In performing the steps illustrated in FIG. 4, call intelligence 150 may be provided in direct connection with a SS7 network through SS7 signal protocols such that the call intelligence is accessible through the PSTN. For example, as various aspects of a call, such as call setup, three-way calling, or call redirecting, are implemented with respect to a particular call by communication network 130, various systems of the signaling network, such as those involved in events comprising particular DPs of a call, may access call intelligence of the present invention.

In operation according to the illustrated embodiment, a particular aspect of a call is attempted at step 401. For example, a user of terminal 110 (FIG. 1) may attempt to place a call to a particular number, such as that associated with terminal 120 (FIG. 1). Alternatively, a particular call aspect of a call already in progress may be attempted. For example, a call may be in progress between terminals 110 and 120 and a user attempts to invoke a calling service such as three-way calling. Similarly, a call which is being setup between terminals 110 and 120 may be automatically redirected to a different terminal because a user of terminal 120 has previously invoked call forwarding. A call which is being setup between terminals 110 and 120 may initially be directed to a number other than that of terminal 120, being redirected through a remote call forwarding calling service. Particular ones of such call aspects may be detected according to the present invention, such as to minimize unbillable/uncollectable revenue risk, to prevent utilization of particular calling aspects with respect to certain users, locations, lines, etcetera. Accordingly, DPs associated with the call may be utilized to recognize a particular call aspect being attempted or implemented, such as by a SSP, STP, SCP, and/or other device of signaling network 140 (FIG. 1).

Preferably a determination is made as to whether the call meets a first selected criteria for call intelligence processing according to the present invention. For example, call intelligence processing may be provided with respect to calls being placed to and/or from a particular number, line, location, etcetera, calls for which a particular aspect is being attempted, calls having been identified for call intelligence processing, and/or the like. For collect calls, calls made from correctional facilities, calls made on a 1010XXX or 900 service, or other basis where risk of collection is relatively high, the first selected criteria may be provided by the destination number, the service code, or otherwise by a service provider and the second selected criteria is a risk that no collection can be made on the attempted call if completed. According to one embodiment of the present invention, call intelligence processing is implemented with respect to calls placed from a particular facility, such as a prison facility. Therefore, a device of signaling network 140 may recognize a call origination attempt from the facility as meeting the first selected criteria. Additionally or alternatively, embodiments of the present invention may be implemented with respect to calls being placed to a particular individual, such as a crime victim or judge. Therefore, a device of signaling network 140 may recognize a call origination attempt to such an individual, e.g., the individual's number, location, etcetera, as meeting the first selected criteria.

It should be appreciated that determinations with respect to a first selected criteria being met for a call may include determinations of multiple orders. For example, it may first be determined that a call is a candidate for call intelligence processing and then the particular call aspect being attempted analyzed to determine if call intelligence processing is desired. Similarly, it may be determined that a call is a candidate for call intelligence processing and then local information, such as a previous positive or negative response from call intelligence 150 associated with the current call in some way (e.g., line, number, location, etcetera) stored at a device of signaling network 140, analyzed to determine if call intelligence processing is desired.

According to one embodiment particularly useful with respect to schemes for avoiding long distance charges, it is initially determined whether the call is interlata and/or within a local calling area. A routing table of specific area codes and prefixes (NPANXXs) and/or capability (alias) point codes relevant to served locations may be stored for use in the foregoing determination. If the call is interlata and/or within a local calling area call intelligence of the present invention may be invoked, such as to detect call redirecting, to block calls which impermissibly attempt to avoid long distance charges by the calling service provider. However, if the call is intralata it might be assumed that the call is not impermissibly attempting to avoid long distance charges, as such charges are incurred intralata, and invocation of call intelligence for determinations relative to such activity may be omitted, thereby optimizing resource utilization. Such multiple order determinations may be particularly useful in expeditiously treating subsequent calls where a negative call treatment response has been previously provided by call intelligence processing, without further processing by call intelligence 150. Additionally or alternatively, such multiple order determinations may be useful in providing for call treatment according to the present invention at various points throughout a call.

According to the illustrated embodiment, if it is determined that the first selected criteria is not met with respect to the call, processing proceeds to step 409 wherein the call proceeds without intervention of call intelligence 150. Proceeding with respect to the call may encompass allowing the particular call aspect attempted to be implemented and, therefore, the call to proceed. Accordingly processing may again return to step 401 to identify subsequent attempts to implement a particular call aspect with respect to that call. Additionally or alternatively proceeding with respect to the call may encompass a device of signaling network 140 terminating the call. For example, where the first selected criteria is determined not to have been met due to previous negative call treatment information having been provided by call intelligence 150, proceeding with the call at step 409 may provide for playing a recorded message announcing a reason for terminating the call (similar to that of step 413 discussed below) and the call may be terminated.

If, however, it is determined that the first selected criteria is met with respect to the call, processing according to the illustrated embodiment proceeds to step 403. At step 403 a query associated with the attempted call may be made to call intelligence 150, such as using signaling protocols of signaling network 140 (shown in FIG. 1). The query may include information such as information with respect to the originator of the call (e.g., number, location, line, account, central office, etcetera), information with respect to the call destination (e.g., number, location, line, account, central office, etcetera), information with respect to the aspect of the call being attempted or implemented (e.g., call setup, three-way calling, call redirecting, etcetera), and/or like information.

Call intelligence 150 of the preferred embodiment scores the call for treatment according to the present invention at step 404. Such scoring may be based upon second criteria. For example, criteria used in scoring a call according to the present invention may comprise information provided in the aforementioned query. However, criteria used in call scoring according to preferred embodiments of the present invention additionally or alternatively comprises information indicative of collection risk, e.g., operating company numbers, account owner, originating line number, dialed number information, call detail records, line providers, alternative billing services, number portability, call history, etcetera, (box 410) and/or law enforcement information, e.g., whether or not to complete the call based upon legal restrictions, whether or not to monitor the call, etcetera, (box 411), such as may be provided by database 151. A decision metric is preferably applied by call intelligence 150 to the query to accomplish the scoring relative to the second criteria. Detail with respect to call scoring is shown in the above referenced patent application entitled "Optimizing Profitability in Business Transactions," previously incorporated herein by reference.

It should be appreciated that a decision metric could be formed based upon a query of criteria embodied in multiple databases within the AIN and the criteria comprising a determination on whether or not and how to complete the requested call in consideration of a plurality of pre-selected factors stored in the particular database handling the call.

Call intelligence 150 may provide, such as through the SS7 network, either a raw score for return to the query control or a command determination of how to treat the call based upon the scoring (step 405). For example, call treatment information provided by call intelligence 150 may simply be a positive or negative acknowledgement, indicating that the attempted call aspect should be allowed or prevented. Alternatively, call treatment information provided by call intelligence 150 may be a scoring metric utilized by a receiving device in determining desired treatment of the call.

It should also be noted that information can be obtained from the SS7 network outside of the call processing flow in a batch method and stored for later retrieval during the call processing flow. For example, it is intended that a series or set of called phone numbers collected during earlier calls is "processed" or "batch processed" through the call intelligence engine and the results stored for future call processing or analysis.

A device or devices of the signaling network preferably receive the call treatment information provided by call intelligence 150 and make a determination as to whether the call aspect is to be allowed or implemented (step 406). Where the call treatment information is a scoring metric, for example, a device of signaling network 140 may implement an algorithm to determine if the scoring metric indicates the attempted call aspect should be allowed/invoked. Where the call treatment information is a positive/negative acknowledgement, a device of signaling network 140 may make a branching decision without further processing of the information.

If the call treatment information provided by call intelligence 150 indicates the particular attempted call aspect should be allowed, processing preferably proceeds to step 407 wherein communication network 130 and/or signaling network 140 operate to allow/implement the call aspect. For example, if the call aspect was setting up of a call based upon a new call origination, call setup may be allowed to proceed to thereby place terminal 110 in communication with terminal 120. Likewise, if the call aspect was a user invoking three-way calling, call setup with respect to the third party may be allowed to proceed to thereby place terminals 110 and 120 in communication with a third terminal (not shown). Processing may again return to step 401 from step 407 to identify subsequent attempts to implement a particular call aspect with respect to that call.

If the call treatment information provided by call intelligence 150 indicates the particular attempted call aspect should not be allowed, processing preferably proceeds to step 412 where a determination may be made as to whether an alternate call treatment is available. For example, where a call aspect is prevented due to a call score indicating an unacceptably high collection risk, alternative call payment techniques may be available to facilitate the call with acceptable risk. Accordingly, processing may proceed from step 412 when it is determined that alternate call treatment is available to step 408 wherein the alternative call treatment is facilitated. Examples of facilitation of such alternative call treatment are shown and described in the above referenced patent applications entitled "System and Method for Reverse Billing of a Telephone Call" and "Systems and Methods for Offering a Service to a Party Associated with a Blocked Call," previously incorporated herein by reference. Processing may again return to step 401 from step 408 to identify subsequent attempts to implement a particular call aspect with respect to that call.

In embodiments of the present invention, the received phone number may be recorded for future processing. In order to facilitate alternate call treatment, the received phone number may be stored in association with creation of a call record. The received phone number may be stored in a suitable database, file, and/or the like. The database, file, or the like may be then accessed to retrieve the phone number and a call is generated to a party associated with the phone number. The generation of the phone call may occur in a manual or autonomous manner. For example, an automated call distributor (ACD) may be utilized to generate a call to the phone number and to connect a customer service representative to the answering party. Alternatively, an automated call application may be utilized to generate a call the phone number and an interactive voice response (IVR) application may be utilized to communicate with the answering party. This follow-up call may be used to offer a service (e.g., enabling the answering party to receive a subsequent collect call from the calling party) to the answering party.

Processing may proceed from step 412 when it is determined that alternate call treatment is not available to step 413 wherein a recorded message is played to announce that the attempted call aspect will not be implemented and/or to announce that the call will be terminated. Thereafter, attempts to implement the attempted call aspect, or perhaps the call itself, may be terminated. Of course, there is no requirement that a message be played according to the present invention.

It should be appreciated that embodiments of the present invention may operate to proceed with particular call aspects in a particular way according to the call treatment information provided by call intelligence of the present invention. For example, call treatment information of the present invention may indicate that an attempted call aspect, such as setting up a new call, should be allowed in a substantially typical fashion, but that additional call processing, such as notifying a law enforcement agency of the call, recording the call, providing call detail information to a system for call accounting, and/or the like, should be accomplished according to the present invention. Accordingly, step 407 may operate to perform call processing in addition to or in the alternative to proceeding with the particular call aspect attempted in response to call treatment information of the present invention.

Figure 5:
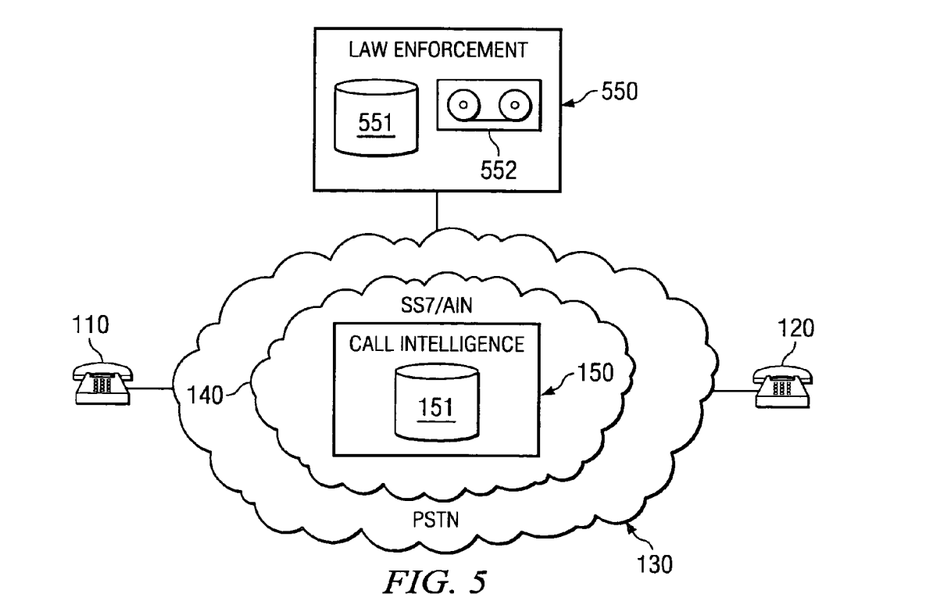
FIG. 5 shows a communication system adapted according to an embodiment of the present invention.

Directing attention to FIG. 5, an embodiment providing call processing in addition to proceeding with the particular call aspect attempted in response to call treatment information is shown. In the embodiment of FIG. 5 in addition to allowing a new call origination to be setup, additional call routing is provided based upon criteria relevant to the particular call, such as a particular origination or destination number, a particular class of calls or originating or destination numbers, etcetera. The additional call routing of the illustrated embodiment results in coupling such selected calls from an originating central office to a particular destination, such as law enforcement 550, in addition to or in the alternative to setting up the call as desired by the caller.

For example, selected calls may be routed to destination 550 to aid law enforcement or investigation of criminal activity with respect to the call. In a preferred embodiment a call processor (not shown) at an inmate facility (e.g., jail or correctional facility) places an identifier on outbound inmate calls relative to the destination or origination number for all or pre-selected numbers originating from or calling into a correctional facility or jail. For example, the identifier could be an ANI number associated with the inmate facility calls. Based upon the identifier, SCPs, such as under control of call intelligence of the present invention, may set up the call to be routed to law enforcement 550. For example the call could be tapped and monitored, e.g., recorded via recorder 552, and/or further analyzed, e.g., using law enforcement database 551, while still being completed. The call could also be blocked or terminated, perhaps responding with a recorded message supplied either by the call processor, call intelligence 150, or the PSTN. Of course, call intelligence 150 may identify and/or make determinations regarding treatment of a call, including performing call processing in addition to or in the alternative to proceeding with the particular call aspect attempted, without the use of the aforementioned identifier, if desired.

Similar to the embodiment illustrated in FIG. 5, call intelligence may determine that a particular call is associated with a pre-paid account or is to be billed to a particular account (e.g., a number which is neither the calling nor called number). Accordingly, in addition to allowing a new call origination to be setup, additional call routing to provide call detail to an appropriate accounting or billing system, such as may be coupled to communication network 130 and/or signaling network 140 similar to law enforcement 550, may be provided at step 408 according to embodiments of the present invention.

Although preferred embodiments have been described above with reference to call intelligence of the present invention being coupled to communication and signaling networks for receiving call treatment queries and providing call treatment information, it should be appreciated that other information may be exchanged therebetween according to embodiments of the present invention. For example, call intelligence of the present invention may monitor various aspects of the operation of communication network 130 and/or signaling network 140, such as to populate/update database 151. Similarly, call intelligence of the present invention may be linked to other informational databases (e.g. a LIDB in the AIN) for populating/updating information in database 151, such as on a pre-selected interval or event. Accordingly, call intelligence 150 of the preferred embodiment may collect and/or provide call detail records in real-time, thereby eliminating the need to wait for a LEC or other provider to compile and provide such records.

Moreover, it should be appreciated that call intelligence of the present invention is not limited to communication with, or providing call intelligence processing with respect to, devices of the communication and/or signaling networks. For example, facilities having premise-based call processing suffer from disadvantages associated with fraud control, validation, unbillable calls, and unavailability of real-time data and services available on the SS7/AIN networks. Accordingly, call intelligence of the present invention may be coupled to such systems, such as via a signaling gateway, to provide call intelligence with respect thereto. Additionally or alternatively, such call processors and facilities management databases may be coupled to the SS7 and/or AIN networks through a signaling gateway to provide such advantages as real-time linkage with law enforcement or multi-facility management.

Figure 6:
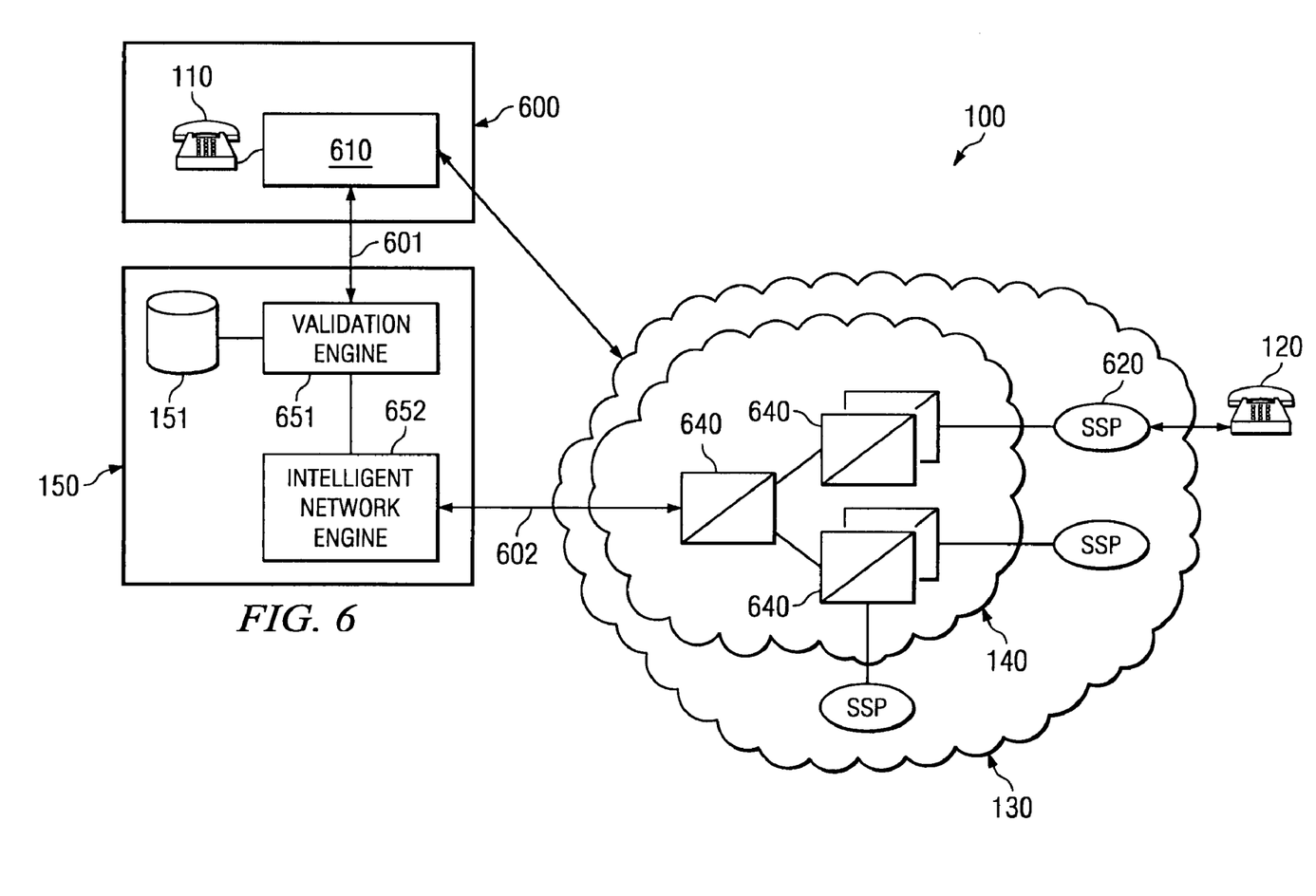
FIG. 6 shows detail with respect to an embodiment providing call control operation in response to call treatment determinations of the present invention.

Directing attention to FIG. 6, detail with respect to an embodiment providing call control operation in response to call treatment determinations of the present invention is shown. The embodiment of FIG. 6 shows calling party terminal 110 disposed at facility 600, such as may comprise an inmate facility (e.g., jail or correctional facility) or other controlled environment facility (e.g., a hospital, a camp, a hotel, a nursing home, a school, a dormitory, a business campus, and/or the like), and including call processor 610. Call processor 610 preferably provides call control operation, such as user identification and/or verification, call validation, call accounting, etcetera, as is shown and described in the above referenced patent application entitled "Information Management and Movement System and Method." It should be appreciated that link 601 shown coupling call processing system 610 and call intelligence 150 may be provided by any suitable communication link, including network 130, network 140, a LAN, a WAN, a MAN, an intranet, the Internet, or combinations thereof.

Call intelligence 150 of the embodiment illustrated in FIG. 6 provides a plurality of functional aspects. Specifically, call intelligence 150 of FIG. 6 includes validation engine 651 and intelligent network engine 652. Validation engine 651 and/or intelligent network engine 652, or portions thereof, may be implemented as code operable upon a processor based system of call intelligence 150, such as illustrated in FIG. 3.

According to a preferred embodiment, validation engine 651 provides validation of calls initiated using call processor 610. For example, where a user of calling party terminal 110 attempts to initiate a call to a party associated with called party terminal 120, call processor 610 may provide particular call data, such as identification of the calling party, the called party number, account information, etcetera to validation engine 651 prior to establishing a communication link between calling party terminal 110 and called party terminal 120, such as to ensure that an operator of call processing system 610 will be able to collect fees for the calling service provided, to determine if the user of calling party terminal 110 is allowed to place a call to the particular called party terminal 120, to determine if called party terminal 120 is to receive calls from facility 600, etcetera.

According to a preferred embodiment, intelligent network engine 652 provides interaction with intelligent network elements, e.g. STPs/SCPs 640 and/or SSPs 620, as may be disposed in signaling network 140 or coupled thereto. Intelligent network engine 652 may query the intelligent network elements, provide information and/or control commands thereto, and the like, as described above. Accordingly, intelligent network engine 652 of a preferred embodiment may comprise an SS7 transport gateway coupled to the SS7 network via access or "A" links (shown in FIG. 6 as link 602) which connect a signaling end point (e.g., an SCP or SSP) of call intelligence 150 to STP 640 of signaling network 140.

It should be appreciated that the various functional aspects shown with respect to call intelligence 150 may be disposed in a number of configurations, and therefore are not limited to the particular embodiment illustrated. For example, validation engine 651, or portions thereof, may be disposed within facility 600 (e.g., within systems of call processor 610) or at some other location remote from intelligent network engine 652, if desired. Similarly, validation engine 651 and intelligent network engine 652 may both be disposed locally to call processor 610, perhaps upon systems thereof.

Validation engine 651 may interact with database 151 and/or intelligent network engine 652 in determining the treatment of particular calls sought to be initiated using call processor 610. For example, scoring information returned from or otherwise derived using intelligent network engine 652 may be utilized as described above in determining that a call should be blocked or otherwise treated.

As a specific example of the operation of call intelligence 150 as illustrated in FIG. 6, a process flow for call redirecting detection is described herein below. However, it should be appreciated that the embodiment of FIG. 6 is not limited to providing call redirecting detection and therefore may be utilized to provide additional or alternative call treatment determinations, such as three-way call detection, credit worthiness determinations, etcetera. Similarly, provision of call redirecting detection is not limited to implementation using the embodiment illustrated in FIG. 6.

Operation of the exemplary call redirecting detection system begins at facility 600 where a user of calling party terminal 110 places the terminal in an off-hook condition. This condition will preferably interface the user with an interactive voice response function of call processor 610. The interactive voice response function will preferably solicit information from the user, such as user identification, account information, called party number, etcetera. Some or all of the information collected by call processor 610 is preferably provided to call intelligence 150, such as via communication link 601. Validation engine 651 preferably utilizes database 151 to determine if the called number is permitted to be called, to verify that the identified user is permitted to make the call, to validate the identified account and confirm that payment criteria are met, and/or otherwise operates to validate the call attempt.

In validating the call attempt according to embodiments of the present invention, validation engine 651 additionally or alternatively provides information to intelligent network engine 652 for interaction with signaling network 140 and/or network elements thereof. In providing call redirecting detection of the present example, validation engine 651 preferably passes the called number to intelligent network engine 652. Intelligent network engine 652 preferably passes the called number information to a signaling network service provider via link 602 coupling intelligent network engine 652 to the signaling network. The signaling network service provider may then use the called number to send a query to the end office associated with called party terminal 120 (the terminal identified by the called number), shown here as comprising SSP 620.

It should be appreciated that the end office may determine various states of the called party terminal, such as whether called party terminal 120 is busy. The end office also has information useful in determining the treatment of the call, such as whether any of a number of different types of call redirecting are available to called party terminal 120 and whether this feature is enabled in one or another of its available types. Information with respect to call redirecting as associated with the called party terminal is preferably then returned to intelligent network engine 652, such as via TCAP or ISUP messages. A call treatment score as discussed above is preferably derived by validation engine 651 utilizing the call redirecting information provided by intelligent network engine 652. For example, if the information regarding call redirecting returned by the query to intelligent network engine 652 is such that further call processing should be prevented, a suitable negative code is preferably returned to validation engine 651 for appropriately scoring the call and returning a score which would cause call processor 610 to block the call attempt. However, if the information regarding call redirecting returned by the query to intelligent network engine 652 is such that further call processing should be allowed, a suitable affirmative code is preferably returned to validation engine 651 for appropriately scoring the call and returning a score which would cause call processor 610 to allow completion of the call attempt.

Operation according to the foregoing embodiment may be relied upon to provide various information useful in call treatment according to the present invention. For example, intelligent network engine 652 may initially determine whether called party terminal 120 is already busy. If called party terminal is busy, then call intelligence 150 may determine that there is no purpose in placing this call or otherwise providing further processing, thereby freeing within the entire system from unnecessary utilization.

However, a more unique feature provided by operation according to the foregoing embodiment is the prevention of calls from being redirected from one location (e.g., location associated with the called party number) or number (e.g., a remote call forwarding number) to another location (e.g., a remote, perhaps forbidden, location). As used herein, call redirecting includes all types of call forwarding (e.g., call forwarding variable and preferred call forwarding (collectively call forwarding) as set forth in Telcordia specifications GR-217 LSSGR, GR-2993 ISDN, GR-580 LSSGR, GR-586 LSSGR, and GR-853 ISDN, the disclosures of which is hereby incorporated herein by reference) and remote call forwarding (e.g., basic remote call forwarding, local remote call forwarding, remote call forwarding 700 service, remote call forwarding 800 service, remote call forwarding foreign exchange overflow as set forth in Telcordia specification GR-581 LSSGR, the disclosure of which is hereby incorporated herein by reference). Call forwarding variable provides a user the ability to have incoming calls forwarded to a different telephone number within or outside the local calling area by dialing a two digit access code and the telephone number to which calls are to be forwarded, wherein the user has control of the activation and deactivation process. Preferred call forwarding (PCF) allows the customer to transfer up to six (6) telephone numbers on a screening list to another number, wherein only the calls on the screening list are forwarded. Remote call forwarding (RCF) is an exchange service which allows incoming calls to be forwarded to a telephone number in a distant location.

It is envisioned that in many situations it may be desirable to detect and/or prevent a calling party's call from being redirected to a number (or location) different than that actually dialed, such as through use of the enhanced calling feature "call forwarding." For example, where facility 600 comprises a prison facility, inmates of the prison using calling party terminal 110 may be prevented from calling particular numbers, such as those associated with judges, victims, or other individuals not desiring to be contacted by prison inmates. Accordingly, call processor 610 and/or validation engine 651 may be programmed to prevent a user of calling party terminal 110 from completing a call to particular identified numbers and/or allowing a user of calling party terminal 110 to complete calls to other particular identified numbers. However, it may be possible to defeat this safeguard by an accomplice at an allowed called number invoking call redirecting to redirect calls originally directed to such an allowed number to another number. Accordingly, the use of call redirecting may present a security risk in particular situations.

Similarly, facility 600 and/or a service provider associated with call processor 610 may derive a significant source of revenue from providing calling services to users of calling party terminal 110. Such revenues may be, at least in part, toll based, such that long distance calls or calls out of or into particular areas are billed at a higher rate than other calls. A clever user might seek to avoid fully paying for the calling services rendered by call processor 610 by placing a call to a particular number, e.g., a number considered local to facility 600, which has call redirecting enabled to redirect the call to a desired location, e.g., in an area that is charged a higher toll for use of call processor 610. Accordingly, the use of call redirecting may present a business risk in particular situations.

As shown above, it may be desirable to determine when a called party terminal has a call redirecting feature enabled, and perhaps recognizing the particular call redirecting feature which is enabled. Embodiments of intelligent network engine 652 return information with respect to a call redirecting feature being enabled with respect to a called party terminal. Preferred embodiments of intelligent network engine 652 return information with respect to line type, busy line status, call forwarding not in service, call forwarding is active, call forwarding is not active, call forwarding on busy is not supported, call forwarding on busy is active, call forwarding on busy is not active, call forwarding on no answer is not supported, call forwarding on no answer is active, call forwarding on no answer is not active, selective call forwarding is not supported, selective call forwarding is active, and selective call forwarding is not active, and/or other parameters such as may be obtainable through SS7 TCAP or ISUP messages. If the service is not supported or it is not active, then the call is preferably determined not to be forwarded with respect to a particular form of call redirecting.

Preferred embodiments of intelligent network engine 652 utilize the TCAP portion of SS7 messages to provide a relatively high level of detail with respect to the forms of call redirecting available with respect to a called party terminal, e.g., a wider range of codes are returned for use in the call redirecting determination. However, embodiments of the invention may utilize ISUP SS7 message parts in addition to or in alternative to the aforementioned TCAP SS7 message portion. It should be noted that information, other than information directly associated with a particular feature, may be used to determine if that feature is present. For example, call redirecting can be determined from call forwarding parameters, but call redirecting can also be determined (deduced) from other parameters. For example, although no call forwarding field indicates a call redirecting feature being enabled, embodiments of the present invention may utilize information, such as that available from a line type field, to conclude that a high risk of call redirecting is present with respect to a particular called number.

Using one or more of the aforementioned detailed call forwarding information codes, various levels of call redirecting detection/blocking participation may be invoked, such as to suit the operational considerations of the facility, the calling service provider, the calling party, and/or the called party. Database 151 may comprise a participation matrix identifying particular forms of call redirecting to be blocked. For example, in one implementation it may be determined that selective call forwarding and call forwarding on busy is typically associated with the benign behavior of a called party seeking to ensure receipt of calls and does not pose an unacceptable security and/or business risk. Accordingly, although either or both of these forms of call redirecting may be determined to be enabled by intelligent network engine 652, validation engine 651 may score the call attempt appropriately to cause call processor 610 to complete the call. However, if any other form of call redirecting is determined to be enabled by intelligent network engine 652, validation engine 651 may score the call attempt appropriately to cause call processor 610 to block the call attempt from completing a call. Of course, other combinations of call redirecting forms being enabled/disabled may be selected in the participation matrix to prevent/allow call attempts to be completed, as desired. Moreover, embodiments may operate to block calls if any form of call redirecting (e.g., call forwarding is active, call forwarding on busy is active, call forwarding on no answer is active, or selective call forwarding is active) with respect to a called party terminal, such as in a highest security mode of operation of call processor 610.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
   detecting an attempt by a user to place a call from an origination point directed toward a destination point;
   querying information regarding a status of a calling service associated with said destination point;
   processing said call attempt as a function of said information regarding said status of said calling service, wherein said processing provides blocking of said call attempt responsive to particular information regarding said status of said calling service, wherein said querying information regarding said status of said calling service is provided by call intelligence coupled to a communication network through which said call attempt is attempting to place a call; and
   logging information with respect to said queried information.

2. The method of claim 1, wherein said calling service comprises call redirecting.

3. The method of claim 2, wherein said call redirecting comprises call forwarding.

4. The method of claim 2, wherein said call redirecting comprises remote call forwarding.

5. The method of claim 2, wherein said information regarding said status of said calling service comprises an indication that call redirecting is active with respect to said destination point.

6. The method of claim 2, wherein said information regarding said status of said calling service comprises an indication that call forwarding on busy is active with respect to said destination point.

7. The method of claim 2, wherein said information regarding said status of said calling service comprises an indication that call forwarding on no answer is active with respect to said destination point.

8. The method of claim 2, wherein said information regarding said status of said calling service comprises an indication that selective call redirecting is active with respect to said destination point.

9. The method of claim 2, wherein said information regarding said status of said calling service comprises information indirectly indicative of said calling service.

10. The method of claim 2, wherein said information regarding said status of said calling service comprises line type information.

11. The method of claim 2, wherein said blocking of said call attempt is provided if said information regarding said status of said calling service indicates any form of call redirecting is active with respect to said destination point.

12. The method of claim 2, wherein said blocking of said call attempt is provided if said information regarding said status of said calling service indicates a particular form of call redirecting is active with respect to said destination point.

13. The method of claim 1, wherein said calling service comprises three-way calling.

14. The method of claim 9, wherein said information regarding said status of said calling service comprises an indication that three-way calling is enabled with respect to said destination point.

15. The method of claim 1, wherein said querying information regarding said status of said calling service utilizes a SS7 message.

16. The method of claim 15, wherein said SS7 message comprises a TCAP message.

17. The method of claim 15, wherein said SS7 message comprises an ISUP message.

18. The method of claim 1, wherein said call intelligence comprises an intelligent network engine coupled to an intelligent network of a communication system.

19. The method of claim 1, wherein said call intelligence comprises a validation engine operable to generate a call processing score based upon said information regarding said status of said calling service.

20. The method of claim 1, wherein said call intelligence is coupled to additional call processing functionality.

21. The method of claim 20, wherein said additional call processing functionality comprises call processing functionality selected from the group consisting of billing and customer care.

22. The method of claim 1, wherein said logged information is utilized in subsequently processing a call attempt.

23. The method of claim 1, wherein said logged information is utilized in trend analysis with respect to a plurality of call attempts.

24. The method of claim 1, wherein said logged information is utilized in batch processing information with respect to a plurality of previous call attempts.

25. The method of claim 1, wherein said call intelligence is disposed centrally with respect to a plurality of locations for which call processing services are provided.

26. The method of claim 1, wherein said call intelligence comprises a system selected from the group comprising a SS7 gateway, a SS7 STP, a SS7 SP, a class 4 switch, and a class 5 switch operable to provide said querying information exclusive of providing any call connection operation.

27. The method of claim 1, further comprising:
determining if said querying information is to be performed with respect to said call attempt.

28. The method of claim 27, wherein said determining if said querying information is to be performed comprises:
analyzing logged information with respect to information queried with respect to a previous call attempt.

29. The method of claim 27, wherein said determining if said querying information is to be performed comprises:
analyzing local service area information and determining if said call attempt is to be terminated within said local service area or external thereto.

30. The method of claim 1, wherein said processing providing blocking of said call attempt is a function of participation information such that particular information regarding said status of said calling service results in different blocking treatment responsive to said participation matrix.

31. The method of claim 1, wherein said origination point comprises a calling party terminal.

32. The method of claim 1, wherein said destination point comprises a called party terminal.

33. The method of claim 1, wherein said destination point comprises a network element serving a called number.

34. A system comprising:
a intelligent network engine in communication with network elements of a communication network and operable to query information regarding a status of a call redirecting service associated with a called number; and
a validation engine in communication with said intelligent network engine and operable to determine a treatment for a particular call attempt from said information regarding a status of said call redirecting service, wherein said validation engine is operable to determine a score for use in further processing of said call attempt.

35. The system of claim 34, wherein said call redirecting service comprises call forwarding.

36. The system of claim 34, wherein said call redirecting service comprises remote call forwarding.

37. The system of claim 34, wherein said information comprises an indication that call redirecting is active with respect to said called number.

38. The system of claim 34, wherein said information comprises an indication that call forwarding on busy is active with respect to said called number.

39. The system of claim 34, wherein said information comprises an indication that call forwarding on no answer is active with respect to said called number.

40. The system of claim 34, wherein said information comprises an indication that selective call redirecting is active with respect to said called number.

41. The system of claim 34, wherein said information comprises a line type associated with said called number.

42. The system of claim 34, wherein said network elements comprise SS7 network elements.

43. The system of claim 42, wherein said intelligent network engine utilizes a TCAP portion of a SS7 message to query said information.

44. The system of claim 42, wherein said intelligent network engine utilizes a ISUP portion of a SS7 message to query said information.

45. The system of claim 34, wherein said score is utilized in said call treatment determination.

46. The system of claim 34, wherein said score comprises a negative indication for preventing further processing of said call attempt.

47. The system of claim 46, wherein said negative indication results from any form of said call redirecting service being detected as active with respect to said called party terminal.

48. The system of claim 46, wherein said negative indication results from a particular form of said call redirecting service being detected as active with respect to said called party terminal.

49. The system of claim 34, wherein said score comprises an affirmative indication for allowing further processing of said call attempt.

50. The system of claim 49, wherein said affirmative indication results from no form of said call redirecting service being detected as active with respect to said called party terminal.

51. The system of claim 49, wherein said affirmative indication results from a particular form of said call redirecting service not being detected as active with respect to said called party terminal.

52. The system of claim 34, further comprising:
a participation matrix utilized by said validation engine in determining said call treatment as a function of a particular form of said call redirecting service detected.

53. The system of claim 34, wherein said validation engine is further operable to provide validation with respect to a payment source utilized in funding costs incurred in association with said call attempt.

54. The system of claim 34, wherein said validation engine is further operable to provide verification of a calling party identity.

55. The system of claim 34, wherein said validation engine is further operable to provide verification that said called number is an authorized number.

56. The system of claim 34, wherein said validation engine is further operable to provide verification that said called number is not an unauthorized number.

57. The system of claim 34, further comprising:
a call processor in communication with said validation engine operable to prevent or allow completion of said call attempt as a function of said call treatment determination.

58. The system of claim 34, further comprising:
a database storing information with respect to said status of said call redirecting service provided by said query.

59. The system of claim 58, wherein said information stored in said database is used by said validation engine in subsequent call treatment determinations with respect to said called number.

60. The system of claim 58, wherein said information stored in said database is used in batch processing a plurality of calls for call treatment.

61. The system of claim 58, wherein said information stored in said database is used in providing trend analysis with respect to a plurality of calls.

62. The system of claim 34, wherein said intelligent network engine comprises a host selected from the group consisting of a SS7 gateway, a SS7 STP, a SS7 SP, a class 4 switch, and a class 5 switch.

63. The system of claim 62, wherein said host does not provide call connection operation with respect to said call attempt.

64. The system of claim 34, further comprising:
a database of information with respect to served locations.

65. The system of claim 64, wherein said information with respect to served locations is utilized to determine if said intelligent network engine is to query information with respect to said call attempt.

66. The system of claim 34, further comprising:
a call billing system operable to provide billing with respect to said call attempt.

67. The system of claim 34, further comprising:
a customer service system operable to provide calling assistance with respect to said call attempt.

68. A method comprising:
detecting an attempt to place a call from a calling party terminal directed toward a called number;
querying information regarding a status of a call redirecting service associated with said called number and an additional status of an additional calling service associated with said calling party terminal; and
processing said call attempt as a function of said information regarding said status of said call redirecting service.

69. The method of claim 68, wherein said calling party terminal is disposed in a facility for which calling services are provided.

70. The method of claim 69, wherein said facility comprises a controlled environment facility.

71. The method of claim 69, wherein said facility comprises a prison facility.

72. The method of claim 68, wherein a called party terminal associated with said called number is disposed remotely from said calling party terminal.

73. The method of claim 68, wherein information regarding said status of said call redirecting service is queried from an intelligent network of a communication system.

74. The method of claim 73, wherein said intelligent network comprises a SS7 network.

75. The method of claim 68, wherein information regarding said status of said call redirecting service is queried from an end office associated with said called number.

76. The method of claim 75, wherein said information regarding said status of said call redirecting service is queried from an SSP of said end office.

77. The method of claim 68, wherein said information regarding said status of said call redirecting service comprises an indication that call redirecting is active with respect to said called number.

78. The method of claim 68, wherein said information regarding said status of said call redirecting service comprises an indication that call forwarding on busy is active with respect to said called number.

79. The method of claim 68, wherein said information regarding said status of said call redirecting service comprises an indication that call forwarding on no answer is active with respect to said called number.

80. The method of claim 68, wherein said information regarding said status of said call redirecting service comprises an indication that selective call forwarding is active with respect to said called number.

81. The method of claim 68, wherein said processing said call attempt comprises blocking said call attempt if said information regarding said status of said call redirecting service indicates any form of call redirecting is active with respect to said called number.

82. The method of claim 68, wherein said processing said call attempt comprises blocking said call attempt if said information regarding said status of said call redirecting service indicates a particular form of call redirecting is active with respect to said called number.

83. The method of claim 68, wherein said processing said call attempt comprises allowing said call attempt if said information regarding said status of said call redirecting service indicates no form of call redirecting is active with respect to said called number.

84. The method of claim 68, wherein said processing said call attempt comprises allowing said call attempt if said information regarding said status of said call redirecting service indicates a particular form of call redirecting is inactive with respect to said called number.

85. The method of claim 68 wherein said information is not specific to call redirecting.

86. The method of claim 85, wherein said information comprises a line type.

87. A method of call processing, said method comprising:
obtaining information with respect to a called number from a network element, said information being indicative of a configuration associated with said called number but not indicative of a call completion status of said called number; and
preventing connection of a call to said called number as a function of said obtained information.

88. The method of claim 87, wherein said obtained information comprises information showing a status of an enhanced calling feature associated with said called number.

89. The method of claim 88, wherein said enhanced calling feature comprises call redirecting.

90. The method of claim 88, wherein said enhanced calling feature comprises three-way calling.

91. The method of claim 87, wherein said obtained information comprises information showing a line type associated with said called number.

92. The method of claim 87, wherein said network element is disposed in a SS7 network.

93. The method of claim 92, wherein said obtained information is obtained via a TCAP message.

94. The method of claim 92, wherein said obtained information is obtained via an ISUP message.

95. The method of claim 1, further comprising:
generating a call from a managing party to an answering party if said call attempt by said user is blocked.

96. The method of claim 95 wherein said call from said managing party comprises offering a service to said answering party.

97. The system of claim 57, wherein said call processor is further operable to place an outbound call offering a service for receiving subsequent call attempts when said call processor prevents completion of said call attempt.

98. The method of claim 68, wherein said processing said call attempt comprises blocking said call attempt, said method further comprising:

placing an outbound call offering a service for receiving subsequent call attempts when said call attempt is blocked.

99. The method of claim 87, further comprising:

generating an outbound call offering a service to facilitate subsequent calls if said call to said called number is prevented.

* * * * *